United States Patent Office 3,423,373
Patented Jan. 21, 1969

3,423,373
CATALYTIC PRECIPITATION PROCESS FOR PREPARING HIGH BULK DENSITY, HIGH MOLECULAR WEIGHT STYRENE-MALEIC ANHYDRIDE POLYMERS
Joseph A. Verdol, Dolton, and Marc O. Thienot, Park Forest, Ill., assignors to Sinclair Research, Inc., New York, N.Y., a corporation of Delaware
No Drawing. Filed Nov. 9, 1964, Ser. No. 409,932
U.S. Cl. 260—78.5           7 Claims
Int. Cl. C07c *1/08, 5/00*

ABSTRACT OF THE DISCLOSURE

A process for the production of high molecular weight, high bulk density polymers of styrene and maleic anhydride which consists essentially of contacting at a temperature of about 85° F. to 125° F. styrene, maleic anhydride and a free-radical initiating polymerization catalyst having a half-life of up to one hour at 80° C. in an inert, normally liquid hydrocarbon solvent to provide as a precipitant therefrom a polymer having a kinematic viscosity at 30° C., in 10% solution in acetone, of at least about 10 centistokes.

---

The present invention relates to an improved process for the polymerization of an olefinic compound such as styrene with a maleic compound such as maleic anhydride to form high molecular weight polymers.

A variety of techniques have been employed for the preparation of olefin compound-maleic compound polymers such as styrene-maleic anhydride copolymers. One such process involves polymerizing styrene and maleic anhydride in solvents possessing high chain transfer constants, usually aromatic solvents possessing reactive benzylic hydrogen atoms at high temperatures, preferably 400–440° F., in the presence of conventional free-radical catalysts which decompose at high temperatures, for example, dicumyl peroxide and other ditertiary alkyl peroxides. The polymer products formed using this system have low molecular weights in the range of about 600–2000, with melting points of about 80–160° C. Since the polymerization in this method is generally carried out at 400° F. or above, the temperature exceeds the melting point of the polymers so that even if the polymers are incompletely soluble in the solvent employed for polymerization they, nevertheless, remain homogeneously dispersed in the system as liquids. The polymer product can be recovered by removing the majority of the solvent from the reaction vessel by flash evaporation at atmospheric pressure or under mild vacuum, and then giving the polymer a final drying with the aid of an extruder. The extruder is conveniently operated at about the melt temperature of the polymer, so that the polymer may be extruded in molten form onto a drying belt or directly into a reaction vessel for further modification.

Unfortunately, the polymerization process described above, although providing good yields of low molecular weight products cannot be used for the commercial manufacture of higher molecular weight polymers, say of about 18,000 to 100,000 or more molecular weight, owing to a multiplicity of factors, both chemical and physical, which are involved. Of prime concern is the fact that high molecular weight products are not obtained at the extremely high temperatures employed, since, under these conditions, premature termination of polymerization occurs due to chain transfer effects. Moreover, the method isolating the lower molecular weight styrene-maleic anhydride resins cannot be applied to isolating the higher molecular weight materials because of their higher melting points. The higher molecular weight resins may have melting points of at least about 200° C. and frequently thermally decompose below or near their melt temperatures. Therefore, these high molecular weight polymers cannot be dried by extrusion since they may be unstable at the temperatures required to maintain them in the molten or semi-molten state during extrusion drying.

A method commonly employed for the production of high molecular weight styrene-maleic anhydride polymers involves polymerization in a hydrocarbon solvent under precipitating conditions. In this method the polymerization is conducted at moderately low temperatures, e.g. about 50–100° C., using hydrocarbon solvents (either aromatic, aliphatic, solvent or mixtures thereof) such as benzene, toluene, xylene, heptane, cyclohexane, etc., or chlorinated hydrocarbon solvents such as methylene chloride; with conventional catalysts such as benzoylperoxide, lauroyl peroxide, azobis-isobutyronitrile and the like. When the polymerization of styrene and maleic anhydride is carried out using solvent and catalyst systems of this type, polymers of moderately high molecular weight and high melting point are afforded. Depending on the specific system selected, the molecular weight may vary from 10,000 to 100,000 or above. Owing to the high melting points and higher molecular weights obtained with solvent and catalyst systems of this type, the polymers obtained are generally insoluble or only slightly soluble in the solvent system during the course of the polymerization reaction; consequently, the polymerization reaction occurs under what may be called "precipitating conditions." That is to say, although the monomers are completely soluble in the polymerization solvent system, the polymer formed is insoluble or very slightly soluble, so that immediate precipitation of the polymer occurs during its formation.

Although polymerizations under "precipitating conditions" can be employed to prepare, for instance styrene-maleic anhydride resins of high molecular weights, such systems are usually considered far from ideal. One major disadvantage of these polymerization processes is that the bulk density of the polymer products is only on the order of 10–15 lbs./ft.$^3$. These extremely fluffy, dust-like polymers are difficult to handle physically, especially during packaging. The low density of the products increases packaging and shipping costs.

A process has now been discovered which provides excellent yields of high molecular weight styrene-maleic anhydride type polymers (e.g. having an average Staudinger molecular weight of at least about 18,000 often up to about 100,000 to even about 1,000,000 or more) having significantly improved bulk densities. In accordance with the process of the present invention a vinyl monomer, such as styrene, and a maleic compound are polymerized in the liquid phase, under precipitating conditions, that is, in an inert, normally liquid hydrocarbon solvent at a temperature of about 85° F. to 125° F., preferably about 100 to to 120° F., and in the presence of a free-radical initiating polymerization catalyst having a half-life of up to 1 hour at 80° C. In the novel polymerization system of the invention, the reaction temperatures defined above are essential for the production of high yields of high bulk density polymer. A reaction temperature of about 131° F. fails to provide a high density polymer product, e.g. of at least about 20 lbs./ft.$^3$ density, while a temperature below about 85° F. cannot produce good yields of polymers and severely slows down the reaction. The styrene-maleic products obtained by the process of the invention are solids which in addition to having a bulk density of at least about 20 lbs./ft.$^3$, possess melting point ranges of greater than about 200° C. and a kinematic viscosity in 10% solution in acetone of at least 10 centistokes at 30° C., often at least about 25 up to about 300 or even 500 centistokes or more.

The catalyst of the present invention is a low temperature, free-radical initiating polymerization catalyst having a half-life of up to 1 hour at 80° C., preferably a half-life of up to 1 hour at a temperature of about 50 to 80° C. Illustrative of these low temperature catalysts are alkyl peroxydicarbonates having the structural formula:

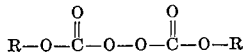

wherein R is a primary, secondary or tertiary lower alkyl radical, say of 1 to 5 carbon atoms, or combinations thereof; and tertiary alkylperoxy esters of neo acids having the structural formula:

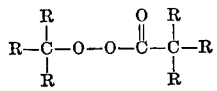

wherein R is a straight or branched chain lower alkyl radical, say of 2 to 5 carbon atoms. Specific examples of suitable alkyl peroxy dicarbonates are dimethylperoxydicarbonate, diethyl peroxydicarbonate, dipropyl peroxydicarbonate, diisopropyl peroxydicarbonate, dibutyl peroxydicarbonate, diisobutyl peroxydicarbonate, methylisopropyl peroxydicarbonate, ethylpropyl peroxydicarbonate, etc. The tertiary alkyl peroxyesters of neo acids include, for instance, tertiary ethyl, pentyl, heptyl and hexyl esters of the neoalkanoic acids having a total of up to about 12 carbon atoms such as neopentanoic acid; $\alpha,\alpha'$-dimethyl butanoic acid; $\alpha,\alpha'$-dimethyl pentanoic acid; $\alpha,\alpha'$-methylethyl pentanoic acid; $\alpha,\alpha'$-diethylbutanoic acid; $\alpha,\alpha'$-diethylpentanoic acid and the like. By neo acid is meant a monocarboxylic acid in which the alpha carbon atom contains no hydrogen atom. The alcohol-derived portion of the peroxyesters preferably has up to about 8 carbon atoms.

The polymerization reaction can be conducted by various processing techniques provided that the monomers and catalyst are in contact with each each other in the inert, hydrocarbon solvent medium and at the prescribed polymerization temperatures. A method for proceeding according to the present invention commprises first forming a stock solution of maleic anhydride, styrene and catalyst in an inert hydrocarbon solvent at conditions wherein no copolymerization occurs (usually below about 75° F.), then feeding this solution to an inert hydrocarbon solvent in a reactor, preferably the same solvent as that which is employed for forming the solution, which solvent has been preheated and maintained at the defined polymerization temperature. The feeding of the stock solution of monomers and catalyst to the inert hydrocarbon solvent is conducted at a rate which does not exceed the rate of copolymerization of the monomers. The inert hydrocarbon solvent may contain other materials, and for instance, may be the solvent present in the medium of a previous reaction of the invention conducted on a continuous or semi-continuous basis.

The maleic anhydride polymerized with the styrene can contain substituents which do not inhibit or unduly interfere with the polymerization reactions. Typical examples of maleic anhydrides include methyl maleic anhydride, propyl maleic anhydride, 1,2-diethyl maleic anhydride, phenyl maleic anhydride, cyclohexyl maleic anhydride, benzyl maleic anhydride, chloro maleic anhydride, and the like, including the maleic acid forms. The styrene or other vinyl monomer, likewise can be substituted with non-interfering groups. Also, in addition to the styrene and maleic anhydride monomers, minor amounts, say up to about 30% by weight of the reactants, of other polymerizable unsaturated compounds can be included in the polymerization to form for instance, terpolymers or other heteropolymers. Examples of polymerizable unsaturated compounds include vinyl compounds such as vinyl acetate, vinyl halides, vinyl ethers, divinyl benzene; unsaturated alkylene monocarboxylic acids and their esters such as acrylic acid, methacrylic acid and their esters; acrylonitrile; compounds such as allyl diglycol carbonate and diallyl maleate; and other olefinically unsaturated compounds such as butadiene, isoprene and the like.

The hydrocarbon solvent employed in the instant process can be any hydrocarbon solvent, liquid under the reaction conditions, which effects solution of the monomers and catalyst but not the polymer product formed and is inert in the reaction system in the sense that it is essentially non-reactive with the styrene or maleic anhydride components. The choice of solvent is frequently dictated by the type of system used for polymer isolation and the molecular weight range of the products desired. For example, solvents having a low degree of chain transfer activity can be used when the higher molecular weight, for example, greater than about 25,000 molecular weight, products are desired.

Solvents suitable for use in the present process include hydrocarbons, including halogenated hydrocarbons, often boiling above about 60° C. at atmospheric pressure, preferably in the range of about 75° to 200° C. As examples of the solvents are aromatic hydrocarbons such as benzene, toluene, xylene, ethylbenzene, p-cymene and the like; alkanes, such as heptane, octane, nonane and the like; cycloalkanes such as cyclopentane, cyclohexane and the like; and admixtures of such hydrocarbons. As examples of halogenated hydrocarbons are halogenated aromatics such as chloro, bromo or iodo benzene or toluene and the like, halogenated alkanes such as the ethylene dichloride, methylene dichloride, carbon tetrachloride and the like. The preferred hydrocarbon solvents contain from about 5 or 6 to 10 carbon atoms.

The proportion of the reagents, solvent and catalyst employed in the polymerization can be varied to a considerable extent, depending primarily upon the particular molecular weight polymer desired. Generally, proportions of styrene to maleic anhydride of about 1:1 to 20:1 and higher can be employed. It is preferred, however, to employ molar proportions of styrene to maleic anhydride of about 1:1 to 3:1. In the method of forming the polymer wherein a stock solution of the monomers and catalyst in the solvent is first prepared, the concentration of the monomers can often vary between about 3 to 75 percent by weight, based upon the total weight of the monomers and the solvent. It is preferred, however, to employ concentrations of monomers between about 5 to 20 percent by weight. Likewise the amount of solvent in the reactor in relation to the stock solution can also be varied but generally may range from about 0.25:1 to 1:0.25 by volume, preferably about 1.5 volumes of the stock solution to 1 volume of solvent are employed.

The low temperature catalyst of the invention can also be employed in varying amounts, depending upon the particular catalyst selected, the reaction temperature, and the molecular weight of the polymer desired. In all cases, however, the catalyst of the invention is employed in catalytic amounts which in general may be much lower concentrations than is required for the conventional higher temperature free-radical catalysts. Normally, about .01 to 1% by weight of the catalyst, based on the total weight of the monomers, is all that is required even though larger amounts could be employed. Catalyst concentrations of about 0.05 to 0.6% by weight are usually preferred.

The following examples are included to further illustrate the invention.

Example I

Styrene and maleic anhydride were polymerized in the presence of a benzene solvent and a diisopropyl peroxy dicarbonate catalyst in the amounts and under the conditions shown in Table I below. The polymerizations were conducted according to the following general procedure: The styrene, maleic anhydride and diisopropyl peroxy dicarbonate were dissolved in benzene. The mixture was cooled to a temperature that precludes copolymerization and fed into a reactor containing a "heel" of benzene heated to the indicated reaction temperature. The mixture was stirred during the reaction in a reactor equipped with a nitrogen inlet, thermometer and reflux condenser. Under the conditions employed the polymer product precipitated as soon as formed. On completion of the reaction the polymer product was separated, filtered and dried. The molecular weights as measured by the kinematic viscosity along with the yields of the product obtained are also summarized in Table I.

Example II

Styrene and maleic anhydride were copolymerized in the presence of a benzene solvent and a tertiary butyl peroxy pivalate catalyst under the conditions shown in Table II below employing the general procedure described in Example I above. The bulk density, kinematic viscosity and yields of product obtained are summarized in Table II.

alkyl peroxy dicarbonate having the structural formula:

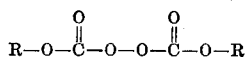

wherein R is a lower alkyl group.

4. The process of claim 1 wherein the catalyst is an ester having the structural formula:

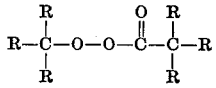

wherein R is a lower alkyl group.

5. The process of claim 4 wherein the catalyst is tertiary butyl peroxy pivalate.

TABLE I.—STYRENE-MALEIC ANHYDRIDE COPOLYMERIZATION IN THE PRESENCE OF DIISOPROPYL PEROXY DICARBONATE

| Tests | Apparent Bulk Density, lbs./ft.³ | Kinematic Viscosity 30° C., 10% Acetone Centistokes | Melting Range, °C. | Yield, Wt. Percent | Monomers Conc., Wt. Percent | Catalyst Conc., Wt. Percent | Reaction Temperature, °C. | Reaction Time, Hours |
|---|---|---|---|---|---|---|---|---|
| 132 | 12.93 | 132.67 | 255–277 | 97.27 | 6.0 | 0.16 | 55 | 3 |
| 96 | 24.71 | 104.66 | 252–288 | 96.40 | 6.0 | 0.06 | 40 | 4 |
| 34 | 13.57 | 101.45 | 249–276 | 100.00 | 10.0 | 0.25 | 55 | 3 |
| 30 | 11.95 | 49.51 | 249–274 | 95.37 | 17.7 | 0.32 | 55 | 1 |
| 98 | 21.30 | 36.99 | 248–288 | 96.40 | 6.0 | 0.60 | 50 | 3 |
| 36 | 13.70 | 21.39 | 240–274 | 91.10 | 6.0 | 0.16 | 80 | 3 |

TABLE II.—STYRENE-MALEIC ANHYDRIDE COPOLYMERIZATION IN THE PRESENCE OF TERTIARY BUTYL PEROXY PIVALATE

| Tests | Apparent Bulk Density, lbs./ft.³ | Kinematic Viscosity 30° C., 10%, Acetone Centistokes | Melting Range, °C. | Yield, Wt. Percent | Monomer Conc., Wt. Percent | Catalyst Conc., Wt. Percent | Reaction Temperature, °C. | Reaction Time |
|---|---|---|---|---|---|---|---|---|
| 141 | 14.56 | 348.56 | 253–278 | 76.05 | 6.0 | 0.02 | 80 | 3 hours. |
| 86 | 24.17 | 337.33 | 254–277 | 98.00 | 6.0 | 0.6 | 40 | Do. |
| 146 | 15.19 | 287.08 | 253–278 | 84.50 | 6.0 | 0.03 | 80 | Do. |
| 88 | 20.30 | 255.65 | 255–278 | 94.00 | 6.0 | 0.6 | 50 | Do. |
| 142 | 13.70 | 65.71 | 252–276 | 98.92 | 6.0 | 0.04 | 80 | Do. |
| 140 | 12.95 | 61.26 | 260–276 | 100.0 | 6.0 | 0.08 | 80 | Do. |
| 138 | 13.32 | 32.96 | 253–267 | 100.0 | 6.0 | 0.16 | 80 | Do. |
| 92 | 13.70 | 6.00 | 250–265 | 97.69 | 6.0 | 0.6 | 80 | 1 hour. |
| 60-1 | 14.56 | 83.90 | | 92.9 | 17.7 | .59 | 80 | 10 minutes. |
| 64-1 | 11.71 | 83.32 | | 94.7 | 14.0 | .59 | 80 | Do. |
| 62-1 | 10.45 | 53.88 | | 92.8 | 14.0 | .8 | 80 | Do. |

The data of Tables I and II demonstrate the high yields of high molecular polymer products of high density that can be obtained by the process of the invention. Also illustrated is the fact that reaction temperatures of about 131° F., fail to provide high density polymer products.

It is claimed:
1. A process for the production of high molecular weight, high bulk density polymers of styrene and maleic anhydride which consists essentially of contacting at a temperature of about 85° F. to 125° F. styrene, maleic anhydride and a free-radical initiating polymerization catalyst having a half-life of up to one hour at 80° C. in an inert, normally liquid hydrocarbon solvent to provide as a precipitant therefrom a polymer having a kinematic viscosity at 30° C., in 10% solution in acetone, of at least about 10 centistokes, and a bulk density of at least about 20 lbs./ft.³.

2. The process of claim 1 wherein the inert hydrocarbon solvent is benzene and the reaction temperature is about 100 to 120° F.

3. The process of claim 1 wherein the catalyst is an

6. The process of claim 3 wherein the catalyst is diisopropyl peroxy dicarbonate.

7. A process for the production of high molecular weight, high bulk density polymers of styrene and maleic anhydride which consists essentially of contacting at a temperature of about 85° F. ot 125° F. styrene, maleic anhydride and a free-radical initiating polymerization catalyst having a half-life of up to one hour at 80° C. in an inert, normally liquid hydrocarbon solvent of about 5 to 10 carbon atoms to provide as a precipitant therefrom a polymer having a kinematic viscosity at 30° C., in 10% solution in acetone, of at least about 10 centistokes, and a bulk density of at least about 20 lbs./ft.³, said free-radical initiating polymerization catalyst being selected from the group consisting of alkyl peroxy dicarbonates having the structural formula:

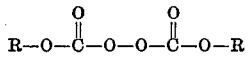

wherein R is a lower alkyl group, and esters having the structural formula:
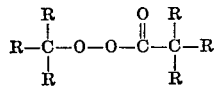
wherein R is a lower alkyl group.
References Cited
UNITED STATES PATENTS
2,497,323 2/1950 Roedel _____ 260—87.5
2,464,062 3/1949 Strain _____ 260—87.5
FOREIGN PATENTS
659,739 3/1963 Canada.
OTHER REFERENCES
Mageli et al., vol. 36, Modern Plastics, 1959 (March–May), pp. 135, 144.
JOSEPH L. SCHOFER, Primary Examiner.
J. KIGHT III, Assistant Examiner.